FIG. I

INVENTOR.
JAMES W. BATCHELDER

April 28, 1964

J. W. BATCHELDER 3,130,863

FEEDER APPARATUS

Filed July 11, 1960

INVENTOR.
JAMES W. BATCHELDER
BY
Williams, Tilberry &Golrick

ATTORNEYS

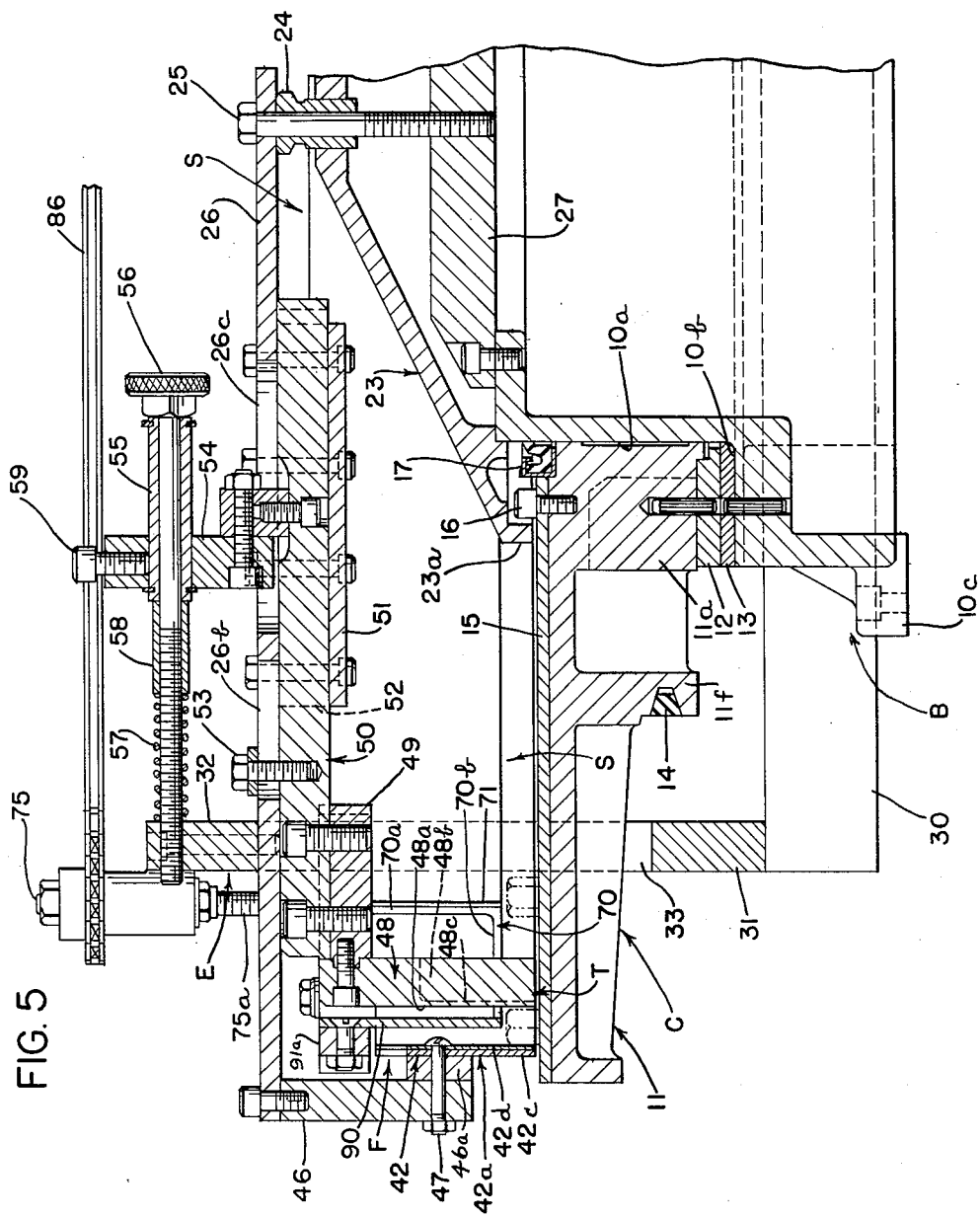

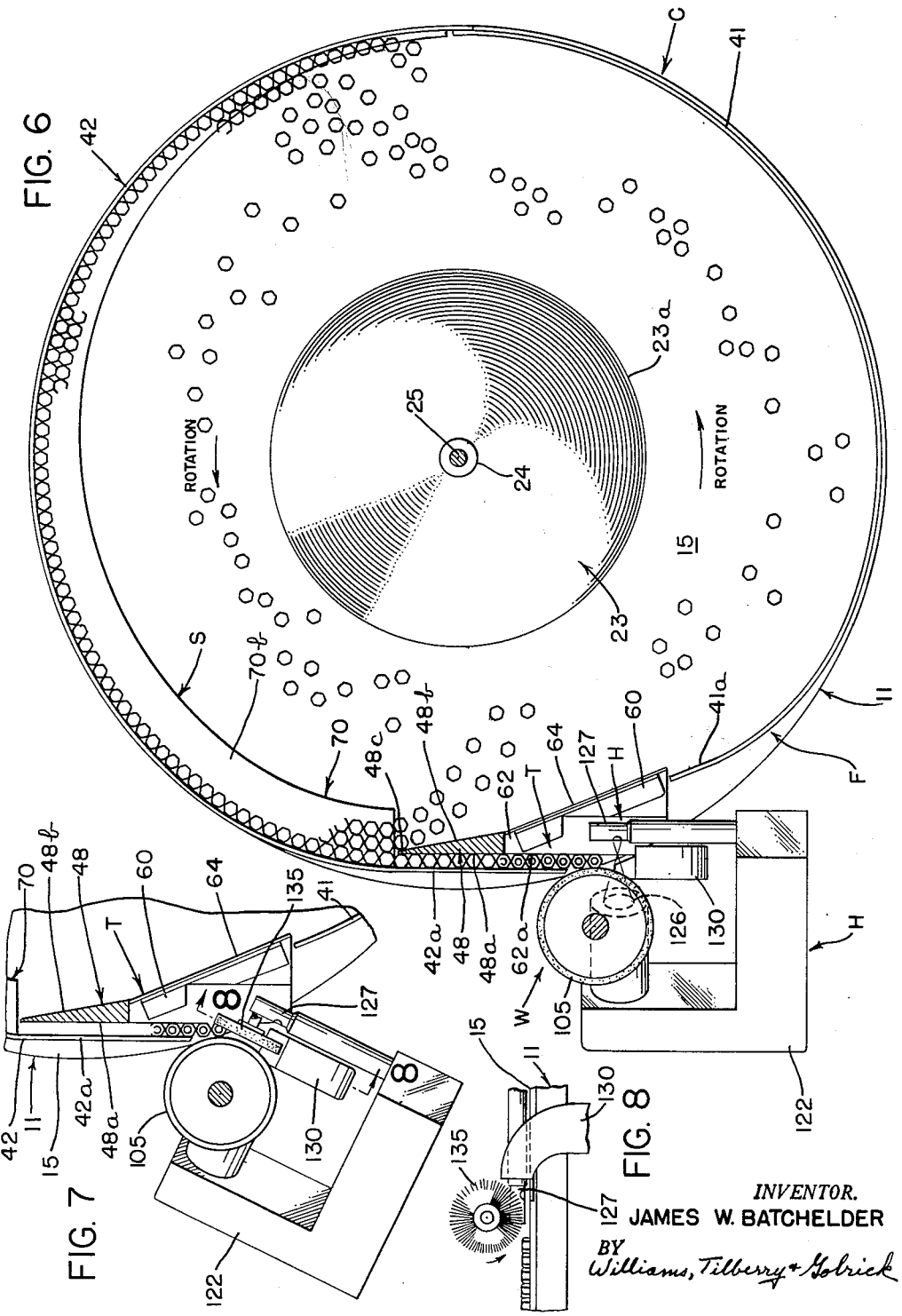

April 28, 1964    J. W. BATCHELDER    3,130,863
FEEDER APPARATUS

Filed July 11, 1960    7 Sheets-Sheet 7

*INVENTOR.*
JAMES W. BATCHELDER
BY Williams, Tilberry & Golrick

ATTORNEYS

United States Patent Office 3,130,863
Patented Apr. 28, 1964

3,130,863
FEEDER APPARATUS
James W. Batchelder, Ascutney, Vt., assignor to Textron Inc., a corporation of Rhode Island
Filed July 11, 1960, Ser. No. 41,964
18 Claims. (Cl. 221—9)

The present invention is generally concerned with feeding of objects such as tablets, nuts and other pieces in such manner that the same may be accurately counted yet delivered at a high overall operational rate.

Prior art feeders of the type intended to accept a bulk load of identical objects and order the same serially for delivery successively to a package filling station or other point in counted lots, particularly those intended to handle such objects as nuts of various type, disk-like parts, tablets and other pieces have been and are beset by one or more of various difficulties or untoward features. For example, where high speed delivery and counting is desired such as should be obtainable with electronic counting devices, say with a photoelectric sensing head, inconsistency or irregularity in the spatial relation between successive pieces or in rate of delivery in many feeders results in counting inaccuracy, thereby requiring a much slower operation than would be expected, or—especially in packaging operations—a deliberate delivery of excess pieces per lot to ensure at least a stated package content, or the use or both expedients. Particularly is this the case where one type of machine is applied to feeding of different types of pieces.

By the present invention there is provided an apparatus combination of means to order pieces for delivery in serial fashion and to ensure discharge of the parts past a sensing transducer means, for example a photoelectric head, in a consistent manner, conducive to accurate counting, while achieving a high feeding capacity. Moreover, there is provided an apparatus relatively compact in structure for the feeding rates involved and relatively simple for the functions attained.

As a specific embodiment of the invention, there is disclosed a horizontal rotary disk type apparatus, adapted for bulk loading and for discharge of the pieces to be fed from the disk across its edge; with means acting on the pieces of the peripheral region of the disk to increase the speed of each piece beyond that last imparted by the disk; thereby consistently and with certainty to achieve at least a certain minimum spacing whereby the pieces may be distinctly sensed by a transducer of an electronic counting device. Further the disclosed disk assembly, including the means for disposing pieces in a manner suited for serial discharge and means determining the discharge path to a counter head or the like, represents an improvement over analagous prior devices. Also a disk-type apparatus is provided which is adaptable for use in conjunction with a known type flow control system and which in combination is especially conducive to fast overall feeding yet with accurate counting.

The general object of the present invention is to provide an apparatus for feeding objects at high overall operational rates in a manner adapted for accurate counting in lots.

Another object is to provide a feeder apparatus for pieces which discharges the same with such consistency of spatial relation between successive pieces that accurate sensing of each piece as a clearly distinct entity by a counter transducer is attainable even at high speeds.

A further object is to provide a disk-type feeder of the type described in combination with a flow control device allowing flow at maximum disk discharge rates for substantially an entire desired lot of pieces, but which markedly reduces, and then terminates such flow at an exact count.

Other objects and advantages will appear from the following description and the drawings wherein:

FIG. 5 is a further vertical section taken substantially as indicated by the line 5—5 in FIG. 1 to show details of a discharge track width adjusting device with a hold-down extension into the track;

FIG. 6 is a more or less schematic plan view of the rotary disk, fence or guide scroll, discharge track with associated photoelectric counting head, and flow control wheel to show the general manner of operation;

FIG. 7 is a fragmentary plan view of the track discharge region showing the use of a rotary brush as a means for insuring consistently adequate separation of parts fed;

FIG. 8 is a view taken as indicated by the line 8—8 in FIG. 7;

FIG. 9 is a fragmentary schematic plan view illustrating the use of an auxiliary high speed disk for parts separation.

Figure 1:
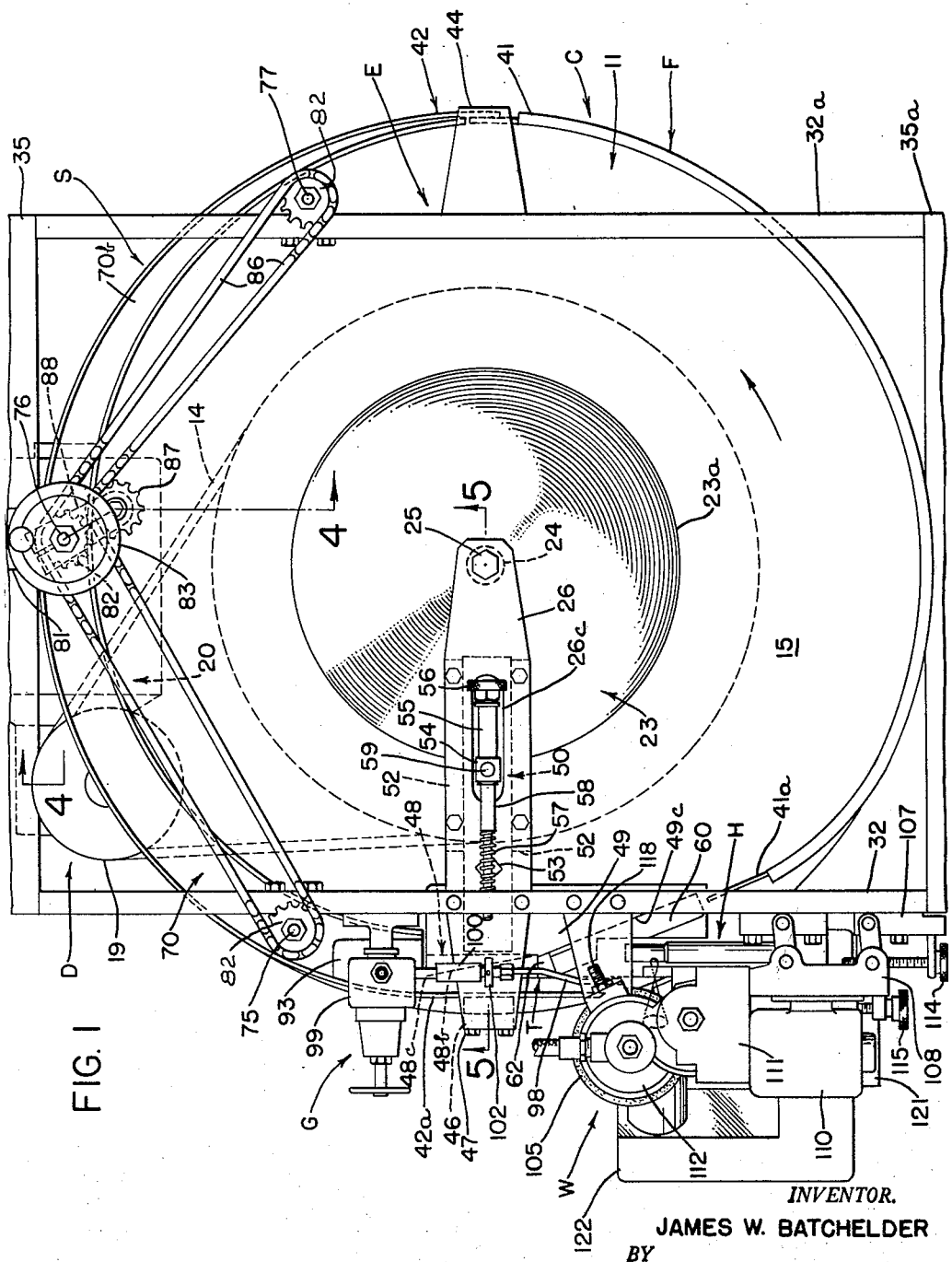
FIG. 1 is a plan view of the pertinent parts of a machine embodying the present invention.

In the drawings, the present invention is shown embodied in a machine adapted to discharge parts (represented and hereafter discussed as hexagonal nuts) in lots which may be exactly counted and directed to some other apparatus, for example to the filling station of a box-conveying and positioning apparatus such as that described in issued U.S. Patent No. 2,825,191 issued March 4, 1958. In its general organization, the apparatus comprises as principal sub-assemblies or functional sub-organizations (see FIGS. 1 and 2), a base B supporting a rotating disk sub-assembly C and a frame E, including certain elements extending across the disk or adjacent its edge at an elevated location for supporting in turn other components hereinafter described; a disk drive mechanism D; a generally closed curved upright fence structure or scroll F closely spaced above the top surface of the rotating disk near its marginal region to define a part receiving space; a part selecting or discriminating means S above the top surface of the disk; a discharge track structure T of adjustable width; a flow control wheel assembly W; a transducer type part sensing means, here a photoelectric counting head assembly H, and accelerating means G for speeding up successive individual parts beyond the velocity established by a disk feeding action in the track, thereby to distinctly separated succesisve parts passing the counter head.

*Disk, Driving Mechanism, Base and Frame*

The cast hollow base B having machined cylindrical and flat annular surfaces 10a and 10b respectively on a short hollow post and a radial shoulder provides a pedestal for rotatably mounting the main cast disk element 11 at its hub 11a; the interposed flat annular members 12 and 13 doweled respectively to the finished lower end of the hub and the annular shoulder forming a thrust bearing. The disk element 11 includes an integral depending cylindrical flange formation 11f having a machined exterior circumferential groove for a driving V-belt 14 trained about a pulley 19 on the output shaft of an electric motor-gear reduction drive unit 20 adjustably mounted on the base B by a bracket assembly 21, whereby the pulley 19 may be shifted in parallelism with the disk axis for adjusting belt tension. Suitable lubricating fittings and distributing grooves are of course provided for the relatively moving parts of the disk assembly and the pedestal as known to the art.

To the broad flat annular top surface of the disk element a correspondingly shaped thin hardened steel disk 15 of saw steel or the like is secured as a replaceable facing by cap screws 16 spaced around the inner peripheral margin and threaded into the underlying disk 11. Preferably the outer margin of the parts supporting surface is roughened to increase the effective coefficient of friction. A lubricant retaining and debris blocking rotary seal assembly 17 is provided between the inner edge of member 15 and the projecting portion of the central post surface 10a. The foot portion 10c of the base, adapted in shape and form to the underlying enviroment, for convenience in replacing the belt 14 or in leveling the surface of the rotary disk is preferably secured to underlying external structure by a spacer bar and adjusting screw arrangement such as that disclosed for the driven rotary table appearing in the above noted U.S. Patent 2,825,191.

A generally broad-based conical cap member 23 (best seen in FIG. 5), fitted on the post 10a and having a dependent base skirt flange 23a outside the location of the cap screws 16 clearing the rotating disk, is secured by a bolt 25, which extends through the radially extending bracket plate 26, the bracket spacer sleeve 24 press fitted into an axial apical cone aperture and is threaded into a bridge element 27 secured across the open top end of the post 10a. The conical surface of the cap member directs pieces loaded into the feeder to disk areas outward of the relatively slow moving inner periphery as well as preventing them from lodging on the center post.

Figure 2:
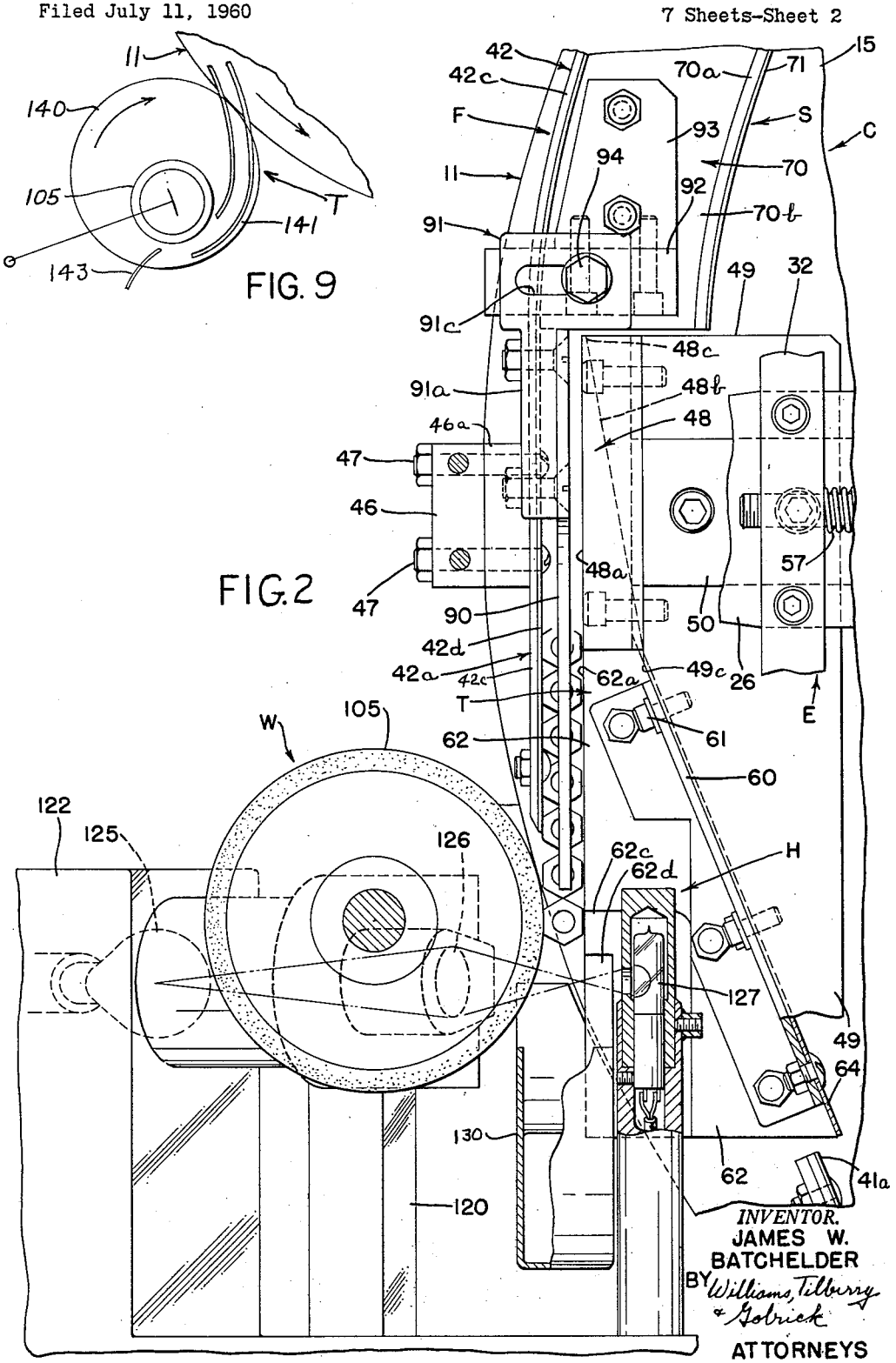
FIG. 2 is a detail in plan of the discharge region of the feeder, certain parts being broken away or removed for clarity of representation.

The frame E includes a pair of beam or bar members 30, secured in parallel disposition along opposite sides of the base B below the level of the shoulder 10b and spanned at respective opposite ends by transverse members 31 beneath and clearing the disk assembly. Each member 31 through vertical spacer elements 33 at opposite ends in turn supports a parallel horizontal top member 32 spaced above the disk surface, as shown for the left side of FIG. 1 in FIGS. 3 and 5. The corresponding structural elements at the right side of FIG. 1 are designated by like numerals with sub-script "a." At opposite sides of the machine, parallel channels 35, 35a are secured to and span the above described frame portions with a slight vertical spacing from the disk edge. The aforegoing members may be secured to each other in any suitable manner to provide a rigid framework assembly.

*Fence Structure*

Figure 3:
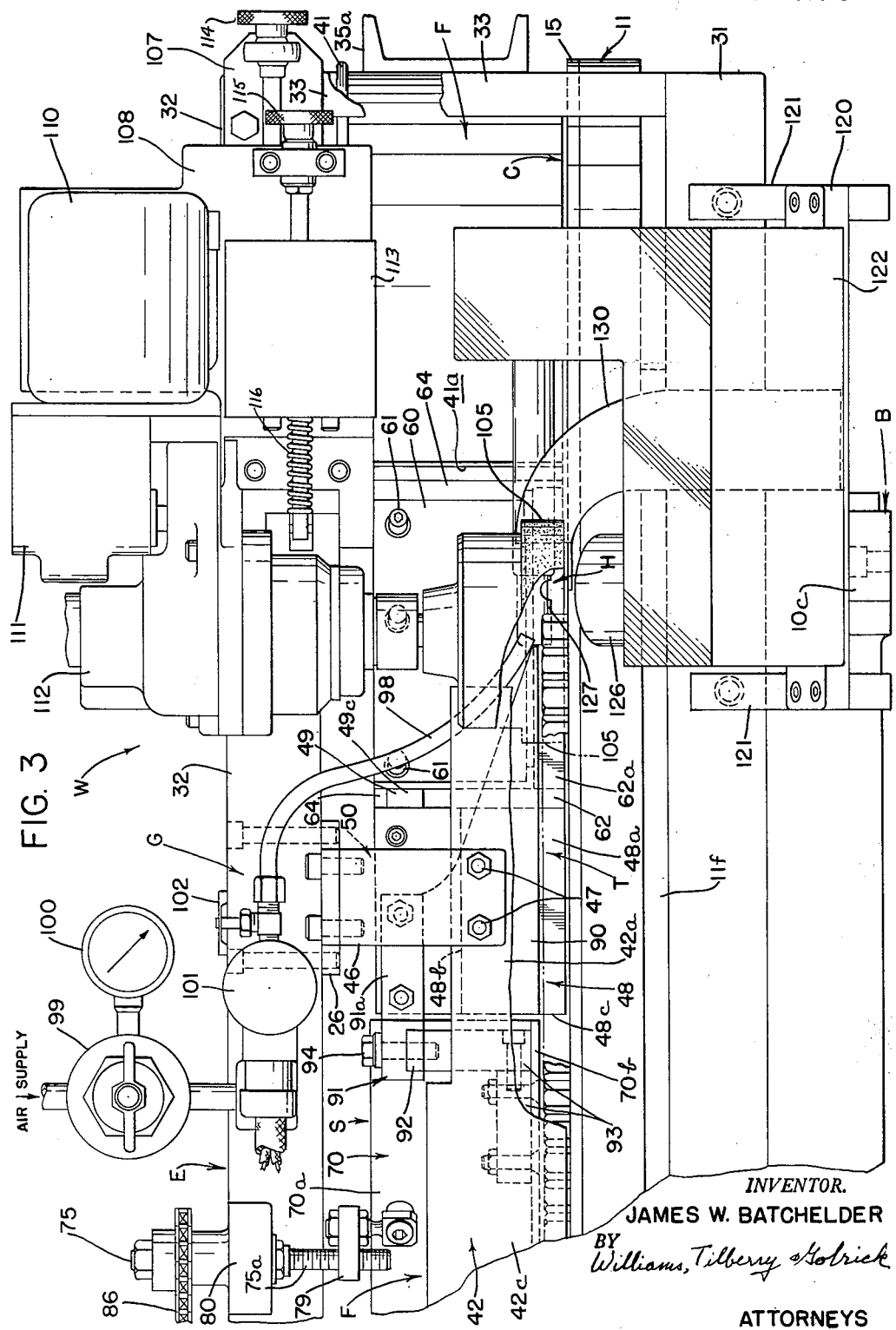
FIG. 3 is a fragmentary view in elevation of the feeder discharge region, discharge or flow control mechanism and adjacent structure or mechanism.
Figure 4:
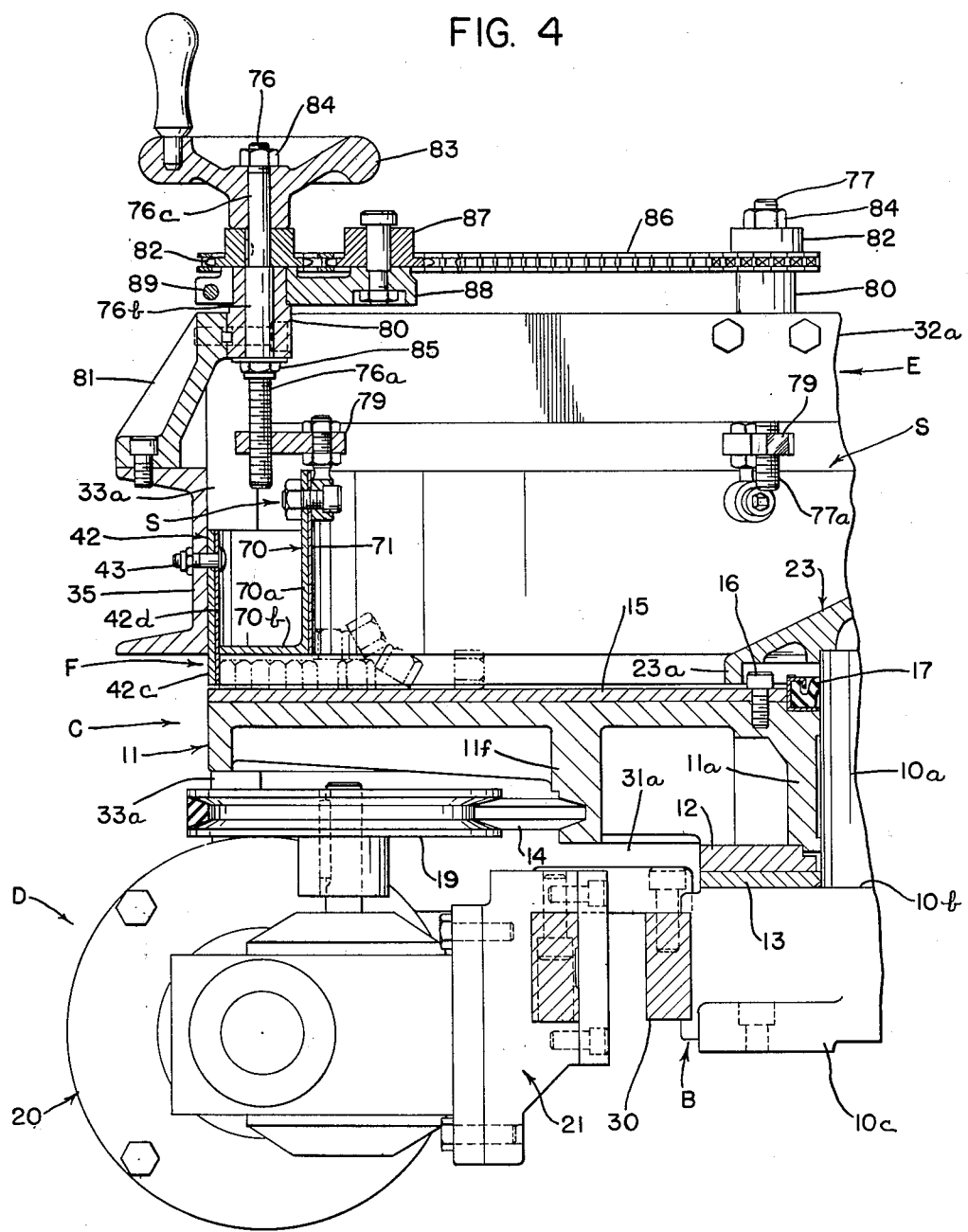
FIG. 4 is a vertical section taken substantially as indicated by the line 4—4 in FIG. 1 to show pertinent features of vertical adjustment means for a part hold-down and rejecting plate, and also the disk mounting and driving structure.

As may be seen from plan views in FIGS. 1 and 6 the scroll or upright fence structure F, comprised of two approximately semi-circular sections 41, 42 arranged to present a roughly circular form, is located just above the very outer margin of the disk assembly over practically its entire extent, except for the terminal portion 42a where the wall or fence curves (in radial sense) inwardly to a straight portion forming a part of the outlet track structure T, and for portion 41a at the beginning of section 41 which starts at an inward part of the track sub-assembly and swings out to the periphery of the disk. Functionally, the angularly disposed vertical inner faces of members 48 and 64 extending from the track inlet to section 41a are to be considered as an inwardly curving part of the fence or scroll F since partially enclosing the part receiving space. As may be seen from FIGS. 3, 4 and 5 (for section 42) each section is comprised of a heavier curved metal plate or strip 42c and a replaceable thinner hardened or spring metal facing strip 42d of corresponding extent bolted together at spaced locations and to surrounding parts of the frame environment such as a depending leg of bracket 44 on 32a (FIG. 1), at 47 on the spacer 46a on leg 46 dependent from bracket 26, and at 43 on the member 35 (FIG. 4).

It is to be noted that section 41 is secured in an overlapped relation to member 42 with the step or shoulder so formed facing away from the direction of approach of parts or the disk (i.e. toward the direction of rotation), so that parts moving along the fence cannot jam against or bounce from, but rather step off the shoulder. A similar arrangement is used at all points where the scroll inner guide face has a discontinuity e.g. from the inner face 48b (on the element 48) to facing 64, and from the latter to 41a (see FIG. 2). The fence or scroll structure provides a circumferentially extended guide surface towards which are urged the pieces placed in the load space thereby tending to line up in radially successive rows moving with the disk toward the inlet of the track structure; the formation of an outer row properly ordered being aided by the part discriminating means to be described.

*Track Structure*

To define a discharge track for pieces being fed, vertical face 48a of the vertical plate or block 48 and its continuation in the edge 62a of plate 62 are disposed in opposed inwardly spaced parallel relation to the straight terminal portion 42a of the fence. For a track width adjustment to accommodate various sizes of parts, the block 48 and plate 62 are supported by an elongated horizontal plate 49 rigidly secured beneath the outer end of a slide member 50 radially movable in a slideway formed beneath bracket plate 26, by plate 51 and spaced parallel longitudinal elements 52. The slide member 50, hence member 48, is clamped in selected position by a bolt 53 extending through longitudinal slot 26b and threaded into the slide bar 50.

A vertical post structure 54 secured on the slide bar 50 to extend through a second longitudinal slot 26c carries a sleeve 55 journalling a knurled headed elongated adjusting screw 56 threaded through frame member 32 providing a means for effecting fine track width adjustments. Here a helical compression spring 57 on the screw shank interposed between the member 32 and a sleeve 58 reacting endwise on the sleeve 55 urges 48 away from 42 as 56 is backed out to widen the track. For making coarse adjustments in track width, the sleeve 55 is shown as being axially adjustably secured in selected position in the post 54 by a set screw or lock screw 59.

The lower portion of the block 48 is cut away or beveled forming a vertical face at 48b (see FIGS. 5, 2, also schematic FIG. 6) to provide a "plow point" or edge 48c at its front end facing the direction of approach of parts, that is, at the track entrance thereby defined, for knifing off and diverting inwardly parts or a row of parts inward of a row properly aligned along the scroll for entrance into the track. The greater reduction in radius before the entrance and the resulting force, causes the parts to hug the fence and avoid impinging upon and ricocheting from the edge with consequent disturbance of feed regularity. The associated block or plate 49 (particularly see FIG. 2) extends laterally away from the slide beyond block 48 in a triangular projection or extension 49c to which the L-shaped mounting bracket 60 of the plate 62 is secured by bolts 61 thereby holding 62 and 48 in rigidly aligned relation of their track defining coplanar faces. The vertical face 62a, the coplanar extension of 48a, extends outwardly beyond the scroll terminal portion 42a to provide a reaction surface for pieces engaged by a flow control wheel. The vertical inner face of the bracket angle 60 is again provided with a facing piece 64 (similar to 42d) obliquely abutting the end of the block 48 at a line offset slightly outwardly from face 48b to avoid a part obstructing shoulder. For like reason the direction of the facing strip 64 and its angular disposition is such that even with the narrowest track its opposite end will be offset inwardly with respect to the adjacent fence end 41a. Adjacent its outer end and edge 62a, plate 62 is relieved and beveled at 62c and 62d, both to accommodate parts of the photoelectric head and to provide light path clearance close to the disk edge and for various positions of the movable track member or rail determining the track width relative to the fixed rail 42a.

Parts Selector Means

In the part discriminating or selecting means S here disclosed, the selector proper comprises a vertically adjustable somewhat crescent shaped member 70, L-shaped in vertical cross section to provide the curved vertical wall 70a curving gradually radially inwardly from a narrow point at the bracket 44 to a maximum spacing from the fence at the beginning of the track; and a horizontal outwardly projecting portion 70b spaced above the disk surface or plate 15 to define a space or passage accepting properly disposed parts. The outer edge of 70b is conformed in curvature to the fence. A wear resistant facing 71 again is removably secured to the inner surface of the wall 70.

The sub-assembly 70, 71 is supported for vertical adjustment on three spaced parallel vertical shafts 75, 76, 77 through screw plates 79 bolted to the scroll assembly and threadably engaged on the respective lower threaded ends of the shafts as at 75a, 76a, 77a; a mid portion 76b of shaft 76 is rotatable in a journal 80 carried by bracket 81 bolted to the transverse channel member 35; and on the upper reduced shaft portion 76c there is a sprocket 82 keyed thereto and above the sprocket an adjusting hand wheel 83. The shaft is axially secured by a nut 84 on the upper shaft end and a nut and washer 85 threaded onto the lower end of the shaft and brought up against a shoulder at the bottom of 76b. Except for omission of the hand wheel, the arrangement for the shafts 75 and 77 mounted on 32, 32a is identical to that of 76, as may be gathered from the structure appearing for 77 in FIG. 4; and accordingly the corresponding elements at shafts 75, 77 bear like reference numerals. An endless sprocket chain 86 is trained around the sprockets 82, and around a take-up sprocket 87 on a take-up arm 88 swingably adjustably supported and clamped by bolt 89 on the upper end of the bracket 80 for shaft 76. Hence rotation of the hand wheel 83 simultaneously rotates all three shafts to raise and lower the assembly equally at all points.

Where as shown in the drawings, nuts are to enter the track in flat position, the selector device, spaced from the disk slightly greater than the nut height permits lying flat to pass thereunder and to assume ordered row alignment, but nuts on edge encounter the inner curved edge of 70b and are either tipped flat, or are diverted toward the center of the disk and completely rejected. Once under the horizontal surface 70b, the nuts are kept flat by a hold-down action of the latter. To continue into the track region the hold-down function of the horizontal surface 70b, a straight hold down bar 90 with bottom surface coplanar with 70b, is adjustably mounted and held midway between the straight fence portion 42a and the opposed surfaces 48a, 62a; the extension actually being a vertically disposed plate tapering downwardly to a blunt point at its outboard free end (see FIG. 3). The plate is carried by an arm 91a on a member 91 having a longitudinally slotted bottom face embracing in slideable relation a guide bar 92 on a bracket 93 secured on the top surface of 70b; while a clamping bolt 94 threaded into 92 through the longitudinally directed slot 91c holding 91 and 92 in adjusted relation.

Since the hold-down function comes into play particularly when free discharge of parts is interrupted by the flow control means hereinafter described, preventing buckling of a row aligned for discharge; and further since the use of the semi-circularly extended assembly S provides an aligned parts row ready for fast feeding (over 38 inches long for a disk two feet in diameter when track is included); the instant structure is preferred to a correspondingly elongated track with entrance guarded by a rotating clearing wheel rejecting improperly disposed pieces.

Accelerating Means

The part accelerating means or device of FIGS. 1–6 comprises a compressed air nozzle 98 directing a jet of compressed air along the path of parts as they escape the track and move towards a counter sensing transducer, such as the photoelectric counting head light beam (to be described). To provide controls conveniently located at the machine for the air jet, a pressure regulating valve 99 provided with a gauge 100 receives the air from a main factory air supply and delivers through a solenoid controlled valve 101 and a shut-off cock 102 to the jet nozzle tube 98. Conveniently the jet or nozzle tube 98 is flexible copper tubing so that its position may be conveniently varied and adjusted in original set-up of the machine or of a particular job. The solenoid valve preferably is integrated with suitable electric control circuitry of the apparatus, so that air is cut off when the rotating disc is not operating. In feeding $5/16$ hexagonal jamb nuts, air delivered at 80 p.s.i. through a nozzle opening on the order of $1/8$ inch has given adequate part acceleration and separation for counting at an overall operational rate of over 2000 per minute, where a 30 inch diameter disk assembly of the type disclosed in the drawings, was rotated at 50 r.p.m.

In FIGS. 7 and 8 a high speed rotary disk-like brush 135 (driving and support means omitted) is shown mounted above and obliquely to the outer edge of disk 11, at a position where the air discharging from the bristles—approximately tangential to a radius one-half of the actual brush radius—will be directed upon a nut about to leave the disk and tip the same quickly from the disk. For this type of operation, the photoelectric head beam is directed across the path of the downwardly tipped nut. Although a scroll surrounding the brush more effectively directs the air, it has been found that a naked brush of two inches diameter driven at 7000 to 8000 r.p.m. is effective in adequately separating $5/16$ hexagonal jamb nuts at feeding rates on the order of 2000 per minute or more.

A vertical or horizontal rotating high speed auxiliary disk adjacent the disk 11, frictionally engaging parts leaving disk 11 and having a part contacted region traveling at a linear rate higher than that of the parts discharged from 11, may be used as an accelerating means. Such an arrangement is shown in FIG. 9 where the small high speed horizontal auxiliary disk 140 is disposed adjacent to and level with disk 11; and the discharge track T is curved outwardly away from disk 11 across 140 to form a portion 141 over the marginal portion of 140 roughly in curved parallelism to the auxiliary disk edge. The inner rail of the track is interrupted to permit access of the wheel 105 to the parts within the track, and beyond 105 the inner wall is reflexly curved at 143 and carried out over the auxiliary disk edge to guide the accelerated parts off the disk along a definite path crossing a photoelectric head light beam.

Flow Control

The track discharge or flow control device or mechanism (see FIGS. 1 and 3) includes a rubber tired wheel 105 rotatable about a vertical axis shiftable toward and away from the vertical face 62a of the movable track wall whereby when the wheel is withdrawn parts may be discharged at a maximum feed rate but with the wheel slowly rotating and advanced into contact with successive parts in the track, a discharge rate is obtained determined by the peripheral speed of the wheel drawing the parts thereunder one by one permitting flow to be completely cut off instantaneously upon stopping of the wheel.

This flow control assembly may be practically identical with that disclosed in U.S. Patent 2,907,154 granted on October 6, 1959, wherein the wheel axis is horizontal rather than vertical. The wheel assembly includes brackets 107 bolted to the outside of transverse frame member 32; a shiftable base 108 connected to 107 for adjusting motion parallel thereto by a parallelogram linkage and carrying an electric drive motor and gear reduction unit 110, 111; a wheel shaft housing 112 pivotally mounted on 111 to swing the axis of wheel 105 in parallelism with and about an axis coincident with an axis of a vertical output shaft of unit 111; and a solenoid 113 for shifting the casing 112, hence wheel 105 against an opposed bias. The housing 112 journalling the shaft of wheel 105 also encloses fast-acting solenoidally actuated clutch and brake devices and a gear transmission from the output of 111 to said clutch, all as disclosed in the aforesaid patent.

The entire assembly is adjustable to position the wheel longitudinally relative to the track, and also to determine the innermost position of the wheel toward the track by adjusting screws 114, 115 again in the manner and by structure disclosed in the aforesaid patent. Here the wheel is biased towards the track by spring 116 interposed between the casing 112 and a member fixed on 108, here the adjustably secured housing of solenoid 113. An adjustable stop screw 118 (see FIG. 1) is carried by a bracket fixed on frame member 32 at a position to be encountered by the housing 112 in swinging toward the track.

*Photoelectric Head*

The housing 122 of the photoelectric head H (see FIGS. 2, 3, 6) is mounted for adjustment both parallel and perpendicular to the track, being directly adjustably clamped on an underlying rod (not shown) disposed in a plane at right angles to the track and carried by a slide (not shown), which is slideably supported and clamped on a bar 120 spaced from the under transverse member or bar 31 by bracket arms 121 for adjustment in a direction parallel to the track. The light source or lamp 125 within the housing, the lens system 126 for directing and focusing the light beam, and the photoelectric cell 127 are supported by the housing in a rigidly fixed relation, so that the entire system may be translated as a unit in the aforedescribed type of adjustments. Also appearing in FIGS. 3 and 6 is a downwardly discharging curved chute tube 130, adjustably clamped on bar 31; and having a mouth aligned with the track outlet and relieved on opposite sides to receive the wheel 105 and accommodate the curvature of the disk edge.

The described mounting of the head facilitates outward and inward adjustments for smaller and larger pieces, and also for moving the same longitudinally on the track in the region downstream of the line of wheel operation to a point where the required parts separation has occurred.

A typical application of the specifically disclosed apparatus is the filling of nuts by counted lots into boxes successively presented by a box conveying and positioning mechanism such as that disclosed in U.S. Patent 2,825,191; in which case there may be used an integrated control system for the box mechanism and track wheel assembly such as that in U.S. Patent 2,907,154. A distinct advantage in overall operation is achieved—where parts are to be supplied to the disk from time to time by a hopper of much larger capacity—through use of a vibrated hopper or a stationary hopper opening to a vibrated feed tray or pan which feed to the disk only when vibrated; and by making the vibrating function subject to an electrical control system responsive to micro switches in turn actuated in response to the load on the disk. For example, the disk supporting pedestal may be mounted on a pair of flexible beams each resting on spacing end supports with a pair of microswitches under one of the beams; one of which switches cuts off supply-maintaining vibration upon downward flexing of the bar to a point indicative of a desired loading, and the other of which initiates such vibration when the bar unbends or straightens under decreasing load to a point indicative of a minimum operating load.

In the operation of the disk feeder, the disk assembly C is continuously driven. Centrifugal force acting on the parts (here nuts for example) frictionally carried along by the disk causes the same to move outward toward the fence, the outermost row then being carried continuously to the selector plate S, which permits flat lying nuts to pass thereunder and move on into and through the track during free or slow discharge; and holds down the row along the scroll (and by the extension, in the track) to keep the row from buckling when the wheel 105 swings in to engage the nuts for initiating greatly reduced flow, and thereafter. Nuts on edge engaging the selector plate are tipped flat or displaced radially inwardly by contact with its curved inner edge. Nuts inward of the row following the scroll that lie flat and pass under S are diverted inwardly by the wedge form of plate 48 and its face 48b, but along with others in the supply space tend to move out to the scroll for another pass at alignment with the track entrance.

The counting of the nuts discharged in free flow to the chute 130 directing the same into a box in a filling station therebelow; the initiation of reduced flow by engagement of the quick-acting clutch in assembly W to drive wheel 105 from a continually running motor 110 and by bias spring swinging of the wheel into engagement with the nuts in the track upon deenergization of solenoid 113 at a preset number of nuts before a desired final count; counting a reduced flow to final count and then releasing the clutch and engaging the fast-acting brake to stop flow, all proceed as described in Patent 2,907,154. The replacement of a filled box with an empty one under chute 130, counter clearing, withdrawal of wheel 105 by energization of solenoid 113, and resumption of counted fast flow are carried out as described in Patents 2,825,191 and 2,907,154. However, the use of any part accelerating means above described permits an accurate count with an even faster delivery in both free flow and reduced flow than would otherwise be possible.

Figure 10:
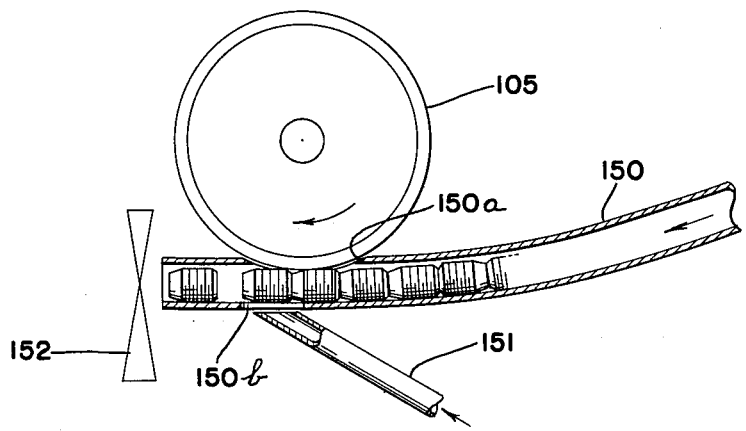
FIG. 10 is a further modification of means for obtaining part acceleration adapted to particular environments.

Even in the case of an inclined track type feeder of the type disclosed in U.S. Patent 2,825,489, applied say for handling headless set screws, the accelerating feature is advantageously used as in FIG. 10 by substituting an inclined tube 150 (of an inner diameter maintaining the parts in end-to-end relation), as and for the lower stationary track disclosed in the patent; the tube being cut out, say in the top portion of the tube a 150a, very close to its delivery end to permit access of the above described type of flow wheel 105 (rotating in the plane of the tube about a horizontal axis) to the parts in the tube; and by further aperturing the tube at 150b just beyond the region where a part is engaged by the wheel for entrance of air from an obliquely disposed jet nozzle 151 directed toward the tube outlet to impinge upon and accelerate parts after they have passed the wheel. The photoelectric head light beam path 152 then is conveniently located just beyond the end of the discharge tube. Alternatively, where some fixed track structure is used as described in the last said patent, a jet nozzle may be located to direct air between the tracks upon objects already past the control wheel.

I claim:

1. A feeder device adapted to receive bulk loaded objects such as nuts, tablets or the like and discharge the same in series flow suitable to precise counting comprising: a frame; a continuously rotatable disk supported by the frame; a discharge track above the disk defined by parallel inner and outer rail members having an entrance at a region spaced inward from the disk edge and an outlet at the disk edge; an upright curved fence structure above the disk beginning at the inner rail to extend out to and follow the peripheral region of the disk over its major extent and curving inwardly to the said outer rail, thereby defining with the disk a load receiving space;

said fence providing an extended surface against which said objects may align in an ordered outer row for discharge through said track; a wedge-shaped diverting element associated with the inner member at the track entrance for diverting objects inward of said outer row toward the inner region of the disk; a horizontally disposed hold-down plate leading to the track entrance having an outer edge conformed generally to the inner surface of the fence and an inner edge curving radially inwardly in the direction of disk rotation, said plate being spaced above the disk to receive objects in selected disposition for forming at least one ordered row, and the curved edge serving to deflect toward the inner region of the disk objects not so disposed; and means at the outlet region of the track for accelerating objects discharged from said disk.

2. A device as described in claim 1 including a photo-electric head with beam traversing the path of accelerated objects leaving said track.

3. A device as described in claim 2 wherein said accelerating means comprises a compressed air jet nozzle aimed in the direction of the discharge path of objects leaving said disk.

4. A device as described in claim 2 wherein the accelerating means comprises a rotary brush impelling successive objects leaving the disk at the end of the track.

5. A device as described in claim 2 wherein said accelerating means comprises an auxiliary rotating disk coplanar with the first said disk and a track extension thereover receiving objects discharged from the first said disk.

6. A device as described in claim 5 including a substantially horizontally disposed track discharge flow control wheel mounted for shifting toward and away from a rail member comprising said extension and adapted to be brought into lateral engagement with objects on the auxiliary track while rotating at a speed determinative of the discharge rate and to be stopped to halt discharge, and thereafter to be withdrawn to permit free discharge flow of said objects.

7. A device as described in claim 1 including a substantially horizontally disposed track discharge flow control wheel mounted for shifting toward and away from the inner rail member and adapted to be brought into lateral engagement with objects on the track while rotating at a speed determinative of the discharge rate and to be stopped to halt discharge, and thereafter to be withdrawn to permit free discharge flow of said objects.

8. A device as described in claim 7 wherein the accelerating means comprises a compressed air jet nozzle aimed in the direction of the discharge path of objects leaving said disk.

9. A device as described in claim 7 wherein the accelerating means comprises a rotary brush impelling successive objects leaving the disk at the end of the track.

10. A device as described in claim 1 wherein the hold-down plate is suspended from a plurality of vertically acting screw adjustment mechanisms each comprising a screw element engaged in a nut element, a rotatable one of said elements supported by the frame and the other supporting the plate, the rotatable elements of said mechanisms being coupled for simultaneous adjusting rotation.

11. A device as described in claim 10 including an extension carried by said plate and extending along the length of said track between said rails.

12. A device as described in claim 1 wherein the hold-down plate is vertically adjustable relative to the disk.

13. A device as described in claim 7 including an extension carried by said plate and extending along the length of said track between said rails.

14. A device as described in claim 13 wherein said extension is mounted on said plate for positional adjustment in direction transverse of said track, and the rail members are relatively adjustable for varying the track width.

15. A device as described in claim 13 wherein the accelerating means comprises a compressed air jet nozzle aimed beyond the end of said extension in the direction of the discharge path of objects leaving said disk.

16. A device as described in claim 15 including a photo-electric head with beam traversing the path of accelerated objects beyond said wheel.

17. A device as described in claim 13 wherein the accelerating means comprises a rotary brush impelling successive objects leaving the disk at the end of the track.

18. A device as described in claim 17 including a photo-electric head with beam traversing the path beyond said brush of accelerated objects leaving said disk.

References Cited in the file of this patent

UNITED STATES PATENTS

| | | |
|---|---|---|
| 1,165,700 | Muessel | Dec. 28, 1915 |
| 2,059,398 | Roemer | Nov. 3, 1936 |
| 2,081,809 | Gladfelter | May 25, 1937 |
| 2,222,895 | Carris et al. | Nov. 26, 1940 |
| 2,621,843 | Kronquest | Dec. 16, 1952 |
| 2,661,881 | Kasper | Dec. 8, 1953 |
| 2,715,978 | Sterling | Aug. 23, 1955 |
| 2,747,351 | Whitecar | May 29, 1956 |
| 2,763,108 | Garrett | Sept. 18, 1956 |
| 2,764,351 | Broscomb et al. | Sept. 25, 1956 |
| 2,825,191 | Batchelder | Mar. 4, 1958 |
| 2,825,489 | Batchelder | Mar. 4, 1958 |
| 2,829,769 | Rockafellow | Apr. 8, 1958 |
| 2,832,462 | Simer | Apr. 29, 1958 |
| 2,847,896 | Boothroyd | Aug. 19, 1958 |
| 2,907,154 | Batchelder | Oct. 6, 1959 |
| 2,961,046 | Moeller et al. | Nov. 22, 1960 |
| 3,033,416 | Russell et al. | May 8, 1962 |

UNITED STATES PATENT OFFICE
CERTIFICATE OF CORRECTION

April 28, 1964

Patent No. 3,130,863

James W. Batchelder

It is hereby certified that error appears in the above numbered patent requiring correction and that the said Letters Patent should read as corrected below.

Column 2, line 58, for "separated succesisve" read -- separate successive --; column 5, line 49, after "permits" insert -- nuts --; column 7, line 70, for "flexible" read -- flexing --; column 8, line 48, for "a" read -- at --.

Signed and sealed this 18th day of August 1964.

(SEAL)
Attest:

ERNEST W. SWIDER
Attesting Officer

EDWARD J. BRENNER
Commissioner of Patents